United States Patent
Mine et al.

(10) Patent No.: US 7,379,681 B2
(45) Date of Patent: May 27, 2008

(54) IMAGE FORMING APPARATUS AND CONTROL METHOD THEREOF

(75) Inventors: Ryuta Mine, Toride (JP); Tadaaki Saida, Kashiwa (JP); Shunsaku Kondo, Toride (JP); Seiji Shibaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 11/418,920

(22) Filed: May 5, 2006

(65) Prior Publication Data

US 2006/0251435 A1 Nov. 9, 2006

(30) Foreign Application Priority Data

May 9, 2005 (JP) ............... 2005-136501

(51) Int. Cl.
   G03G 15/00 (2006.01)
   G03G 15/02 (2006.01)
   G03G 15/043 (2006.01)

(52) U.S. Cl. .................. 399/48; 399/46; 399/50; 399/51

(58) Field of Classification Search .......... 399/48, 399/46, 50, 51
   See application file for complete search history.

(56) References Cited

U.S. PATENT DOCUMENTS

| 6,208,820 | B1 * | 3/2001 | Nami | 399/46 X |
| 6,493,524 | B2 * | 12/2002 | Kamiya | 399/48 |
| 2001/0046390 | A1 * | 11/2001 | Kamiya | 399/46 |
| 2006/0263108 | A1 * | 11/2006 | Zona | 399/48 |

* cited by examiner

*Primary Examiner*—Sophia S Chen
(74) *Attorney, Agent, or Firm*—Canon USA Inc I.P. Div

(57) ABSTRACT

Image forming apparatus in which surface electric potentials of a plurality of surface areas are detected by charging a photoconductor with a different applied bias for each predetermined timing and exposing a plurality of surface areas of the photoconductor by scanning the photoconductor with an optical beam, while changing an exposure intensity of the optical beam for each of the surface areas of the photoconductor. Then, the applied bias necessary for obtaining a predetermined electric potential of a dark section and the exposure intensity of the optical beam necessary for obtaining a predetermined electric potential of a bright section are controlled, on the basis of the surface electric potentials that are detected respectively from the different applied biases and the different exposure intensities. Thereby, the adjustment time can be made shorter than the conventional case.

15 Claims, 11 Drawing Sheets

MAIN SCANNING DIRECTION OF PHOTO CONDUCTOR →

| | 81 | 82 | 83 | 84 | 85 | |
|---|---|---|---|---|---|---|
| FIRST ROUND | LP1 $V_1$ | LP2 $V_2$ | OFF $V_3$ | LP3 $V_4$ | LP4 $V_5$ | Vg1 |
| SECOND ROUND | LP1 $V_6$ | LP2 $V_7$ | OFF $V_8$ | LP3 $V_9$ | LP4 $V_{10}$ | Vg2 |
| THIRD ROUND | LP1 $V_{11}$ | LP2 $V_{12}$ | OFF $V_{13}$ | LP3 $V_{14}$ | LP4 $V_{15}$ | Vg3 |
| FOURTH ROUND | OFF | LP | OFF | LP | OFF | Vg |

TIME ↓

IMAGE FORMING APPARATUS AND CONTROL METHOD THEREOF

BACKGROUND OF THE INVENTION

1. Field of the Invention

The present invention relates to an image forming apparatus of an electro photographic system or an electrographic recording system and a control method thereof.

2. Description of the Related Art

An image forming apparatus such as a copy machine and a printer is common, which forms an electrostatic latent image on a photosensitive drum that is an electrostatic image bearing member by using a laser beam. Such an image forming apparatus modulates the laser beam oscillated from a laser oscillator depending on an image signal and irradiates the laser beam to a polygonal mirror that is rapidly rotating. This laser beam is reflected by the polygonal mirror, and in accordance with the rotation of the mirror, the laser beam is deflected and scanned along an axial direction of the photosensitive drum. Further, this laser beam is focused on the photosensitive drum via an imaging lens to form an electrostatic latent image according to each scanning line of the image.

This kind of image forming apparatus has been required to realize the image formation with a high resolution from a view of reproducibility of minute characters and uniformity such as proportion. In JP-A-10-288874, a method for forming a stable quality of an image is disclosed. In other words, it is necessary to control an applied bias (Vg) necessary for obtaining a predetermined electric potential at a dark section (Vd) and an exposure intensity (LP) of an optical beam necessary for obtaining a predetermined electric potential of a bright section (VL).

Nevertheless, in a conventional image forming apparatus, adjustment of the applied bias (Vg) and adjustment of the exposure intensity of the optical beam (LP) have been carried out by different methods. For example, in order to adjust the applied bias (Vg), Vg is determined by rotating the photosensitive drum three rounds (three revolutions) with different applied biases respectively, and then, in order to determine the exposure intensity of the optical beam, further, the exposure intensity (LP) is determined by rotating the photosensitive drum four rounds with different exposure intensity respectively. It is necessary to rotate the photosensitive drum for the number of revolutions corresponding to the different applied biases and the exposure intensities of the different optical beams. In other words, in this case, for adjustment, the photosensitive drum should be rotated seven times in total. As a matter of course, since the image formation cannot be carried out during execution of a sequence for this adjustment, a user would be waiting.

Further, in order to obtain a high quality picture and a highly stable image forming apparatus, it is necessary to increase a frequency of the sequence of this adjustment. However, if the frequency of the adjustment sequence is increased, it is feared that a standby time of the user is further increased.

SUMMARY OF THE INVENTION

The present invention is directed to an image forming apparatus and a control method thereof.

In addition, the present invention is directed to an image forming apparatus and a control method thereof intending to obtain high quality pictures and high stabilization without increasing a time required for a sequence for adjustment.

The above characteristic is attained by the combination of the characteristics described in the independent claims and depending claims.

According to a first aspect of the invention, an image forming apparatus includes a rotatable image bearing member; a charging device configured to charge the image bearing member with a different applied bias for each predetermined timing; an exposure device which exposes surface areas of the charged image bearing member by scanning the latter with an optical beam, while changing an exposure intensity of the optical beam; an electric potential detecting device detecting respective surface electric potentials of the surface areas in which the exposure intensity is changed; and a control device which controls the applied bias to the charging device necessary for obtaining a predetermined electric potential of a dark section and the exposure intensity of the optical beam necessary for obtaining a predetermined electric potential of a bright section, on the basis of the surface electric potentials that are detected respectively from the different applied biases and the different exposure intensities.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE EMBODIMENTS

Hereinafter, the detailed description of the embodiments of the present invention will be given with reference to the attached drawings. The following embodiments do not limit the invention described in the scope of claims. In addition, various embodiments will be described below, however, the appropriate combinations of respective embodiments are available unless they are not inconsistent with each other.

First Embodiment

Figure 1:
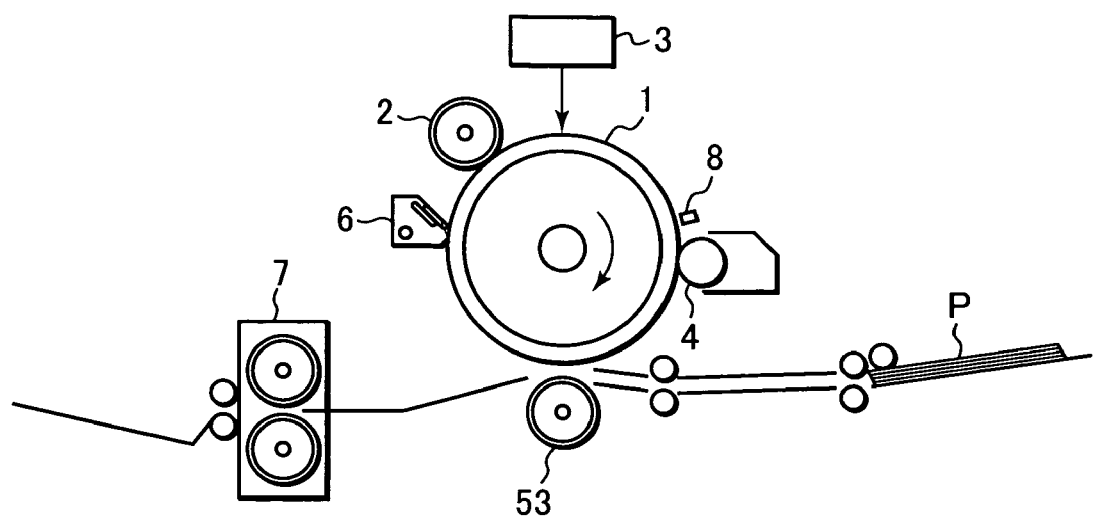
FIG. 1 is a diagrammatic view illustrating principal parts of a printer in an electrophotographic system, which is an image forming apparatus according to an embodiment of the present invention.

FIG. 1 is a diagrammatic view illustrating principal parts of a printer in an electrophotographic system, which is an image forming apparatus according to an embodiment of the present invention.

This printer is provided with a photosensitive drum 1 serving as an electrostatic image bearing member, and in this photosensitive drum 1, an optical conductive layer of a photoconductor such as an amorphous silicon and an OPC (Organic Photosensitive Compound) is formed on an outer circumferential face of a grounded aluminum cylinder. In addition, this photosensitive drum 1 is rotatably driven at a predetermined circumferential velocity (a process speed) clockwise shown by an arrow by a driving unit (not illustrated).

A charge roller 2 can be a contact type of a charge apparatus. This charge roller 2 is rotated sliding against the photosensitive drum 1, and a predetermined bias voltage (Vg) is applied from a high voltage power source. Thereby, the circumferential face of the photosensitive drum 1 is primarily and uniformly treated and charged with a predetermined polarity and electric potential.

An exposure apparatus 3 serves as an apparatus for exposing the surface of the photosensitive drum 1 primarily treated and charged while scanning an optical beam of a predetermined exposure intensity (LP) on this surface. Thereby, an electrostatic latent image corresponding to the image information is formed on the surface of the photosensitive drum 1.

A development apparatus 4 serves as an apparatus for developing the electrostatic latent image on the photosensitive drum 1 by using a developer such as a toner. To the development apparatus 4, a predetermined voltage (VDEV) is applied from the high voltage power source. The formed toner image is transferred onto a transfer sheet P supplied at a predetermined timing at a pressure contact part (a transfer nip part) defined by a transfer roller 53, as a transfer apparatus, and the photosensitive drum 1. A transfer bias voltage having a polarity reverse to the charge electrode of the toner is applied to the transfer roller 53.

Then, the transfer sheet P on which the toner image is transferred is fixed by a fixation apparatus 7 as a permanent image. After transfer of the toner image, residual toner or the like is removed from the surface of the photosensitive drum 1 by a cleaning apparatus 6 to be cleaned. Further, a surface electric potential detecting apparatus 8 serves as an apparatus to detect respective surface electric potentials at various areas on the photosensitive drum 1.

Figure 2:
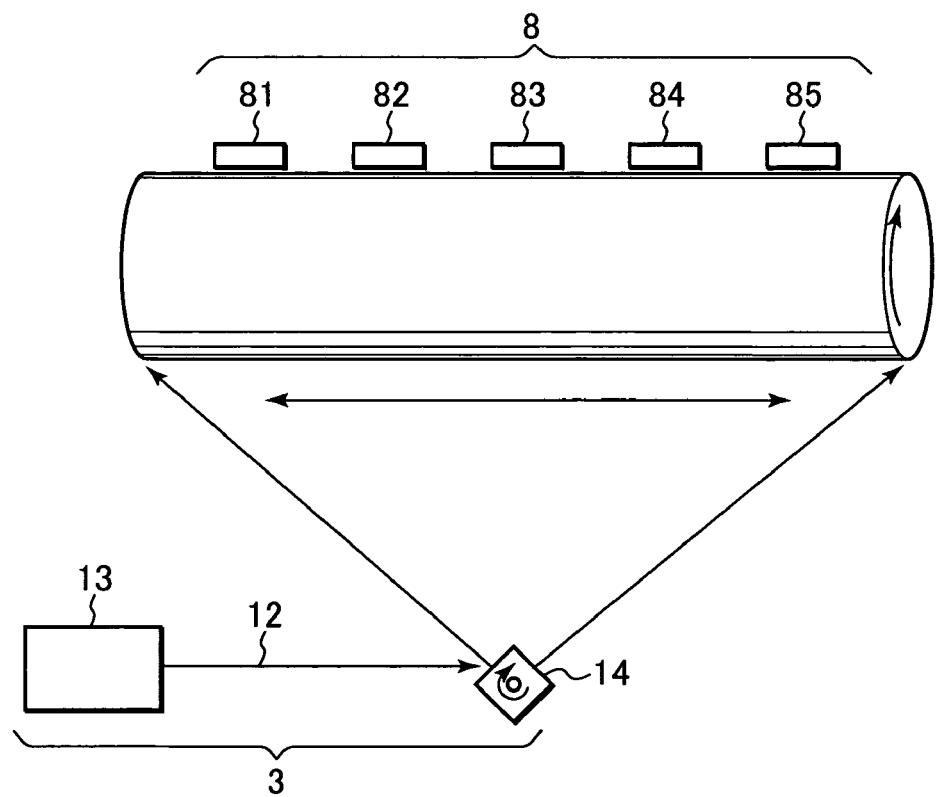
FIG. 2 is a diagrammatic view illustrating principal structures of a laser printer according to the present embodiment.

FIG. 2 is a diagrammatic view illustrating principal structures of a laser printer according to the present embodiment. According to this embodiment, the exposure apparatus 3 includes a laser diode 13 and a polygonal mirror 14. An optical beam 12 outputted from the laser diode 13 exposes the surface of the photosensitive drum 1 while being deflected and scanned by the polygonal mirror 14. The surface electric potential detecting apparatus 8 includes at least one electric potential sensor. In this embodiment, five electric potential sensors 81 to 85 are included in the surface electric potential detecting apparatus 8.

Figure 3:
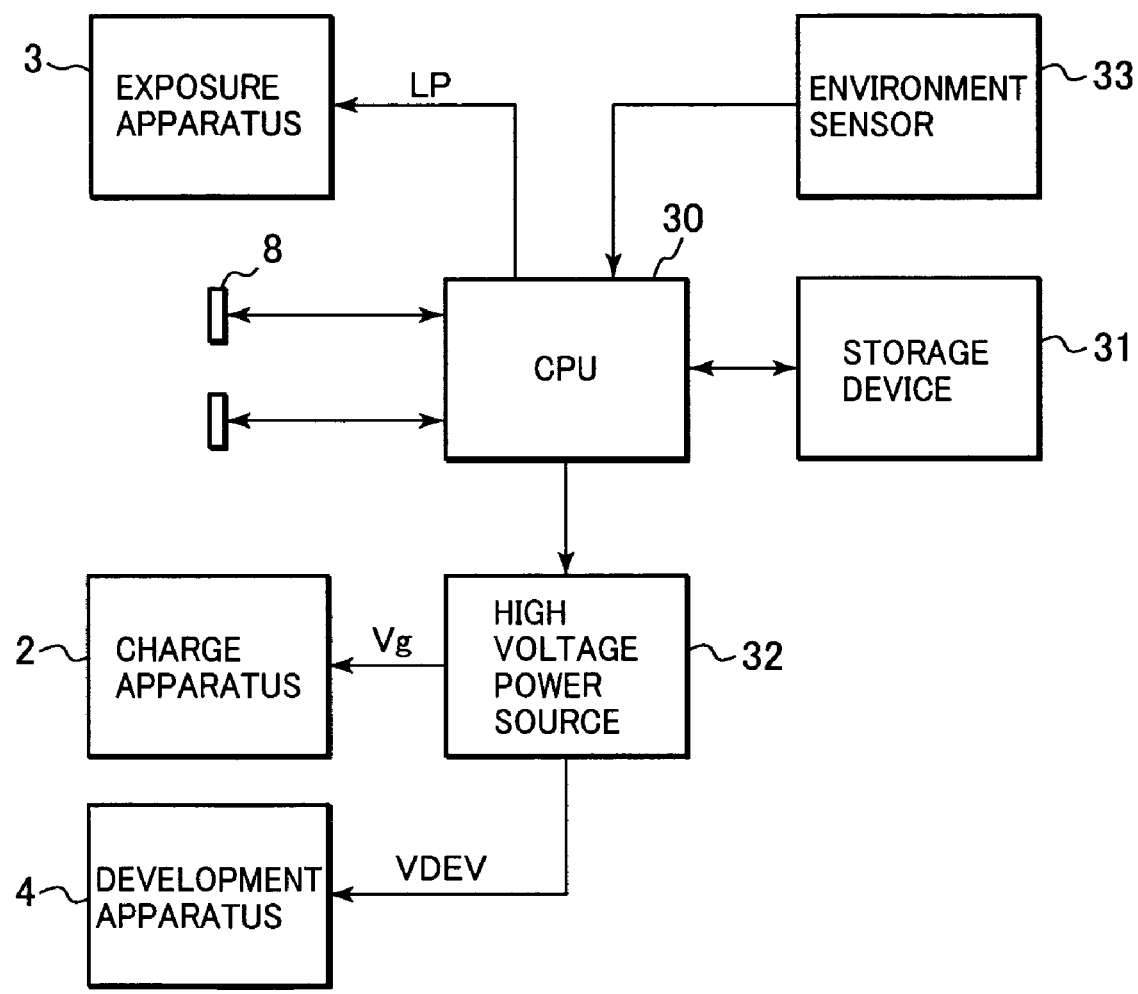
FIG. 3 is a block diagram illustrating principal parts of a laser printer according to the present embodiment.

FIG. 3 is a block diagram illustrating principal parts of the laser printer according to the present embodiment. A controlling apparatus (hereinafter, called as a CPU) 30 serves to totally control each part of the image forming apparatus. A storage device 31 includes a ROM for storing a control program and an RAM serving as a work area or the like. A high voltage power source 32 serves as a power source circuit for applying a predetermined charging bias to the charge apparatus 2 and applying a predetermined development bias to the development apparatus 4 depending on a control signal from the controlling apparatus 30.

An environment sensor 33 serves as a detection unit for detecting an environmental parameter (for example, temperature and humidity) used for the image formation. In the storage device 31, a correspondence relation (for example, a table) between the environmental parameter and a target contrast electric potential (VCONT) is stored in advance. The CPU 30 determines the VCONT corresponding to the detected environmental parameter. Further, the CPU 30 can determine the electric potential of the bright section VL by decreasing this VCONT from the developing bias (VDEV).

The developing bias (VDEV) can be determined by subtracting "a photographic fog removing potential (Vback)" potential from the electric potential at the dark section (Vd) by means of the CPU 30. The photographic fog removing potential is an electric potential determined in advance for preventing the photographic fog (preventing the adhesion of the toner to a white part).

The CPU 30 controls the charge apparatus 2 so as to charge the photosensitive drum 1 with a different applied bias for each predetermined timing (for example, one round or one rotation of the photosensitive drum 1 can be used because the photosensitive drum 1 is unevenly charged around the circumference thereof and charging for one round should be measured and averaged). Further, the CPU 30 controls the exposure apparatus 3 to expose a plurality of surface areas on the photosensitive drum 1 while scanning the optical beam 12. Upon exposure, the CPU 30 controls the exposure apparatus 3 to change the exposure intensity of the optical beam 12 at a timing shorter than the predetermined timing (for example, within one round of the photosensitive drum 1). Thus, the CPU 30 detects respective surface electric potentials at the plurality of surface areas via the surface electric potential detecting apparatus 8 while changing the combinations of the values of the applied bias to the charge apparatus 2 and the exposure intensity of the optical beam 12. Then, the CPU 30 controls the applied bias (Vg) to the charge apparatus 2 necessary for obtaining a predetermined electric potential of a dark section (Vd) and also controls the exposure intensity (LP) of the optical beam 12 necessary for obtaining a predetermined electric potential of the bright section (VL), on the basis of the values of the plurality of surface electric potentials that are detected from the above combinations.

Figure 4:
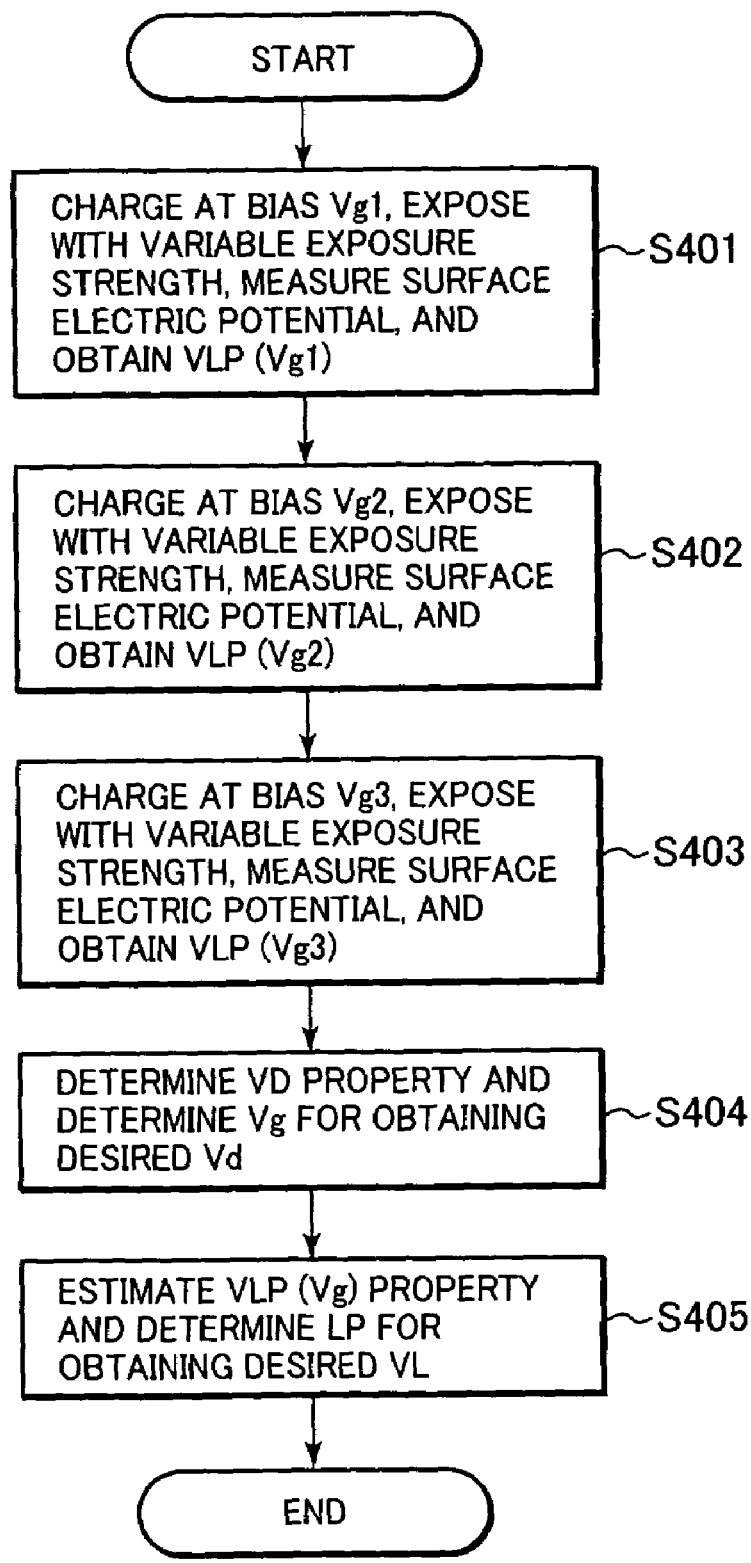
FIG. 4 is a flow chart illustrating an electric potential control method in the laser printer according to the present embodiment.

FIG. 4 is a flow chart illustrating an electric potential control method in the laser printer according to the present embodiment. With reference to FIG. 4, a method of determining the applied bias (Vg) to the charge apparatus 2 necessary for obtaining the predetermined electric potential of a dark section (Vd) and the exposure intensity (LP) of the optical beam 12 necessary for obtaining the predetermined electric potential of the bright section (VL) will be described below. Here, it is assumed that the target electric potential at a dark section (Vd) and the target "photographic fog removing potential" (Vback) are stored in the storage device 31. In addition, it is assumed that a target contrast potential (VCONT) determined based on temperature, humidity, adjustment, and control of an image density, and stabilization and control of a gradation property or the like is also stored in the storage device 31.

In step S401, the CPU 30 turns on a remote signal for controlling the electric potential sensors 81 to 85 to make the electric potential sensors 81 to 85 into an electric potential measurable state. Subsequently, the CPU 30 sets the applied bias to the charge apparatus 2 at Vg1 to charge the photosensitive drum 1. Further, upon scanning of the optical beam 12 in a main scanning direction of the photosensitive drum 1, the CPU 30 allows to scan the optical beam while changing the exposure intensity at a predetermined time interval. This time interval is shorter than a period rotation of the photosensitive drum 1. In addition, the CPU 30 concurrently measures the surface electric potentials V1 to V5 of the respectively corresponding surface areas (on the photosensitive drum 1), by the equidistantly arranged electric potential sensors 81 to 85, to store the measurement results in the storage device 31. Thereby, a relation (a VLP characteristic) of the exposure intensity (LP) with respect to the surface electric potential (V) can be obtained. Further, since the bias to the charge apparatus 2 is Vg1, it is decided that the VLP characteristic in this case is represented as VLP (Vg1).

Figure 5:
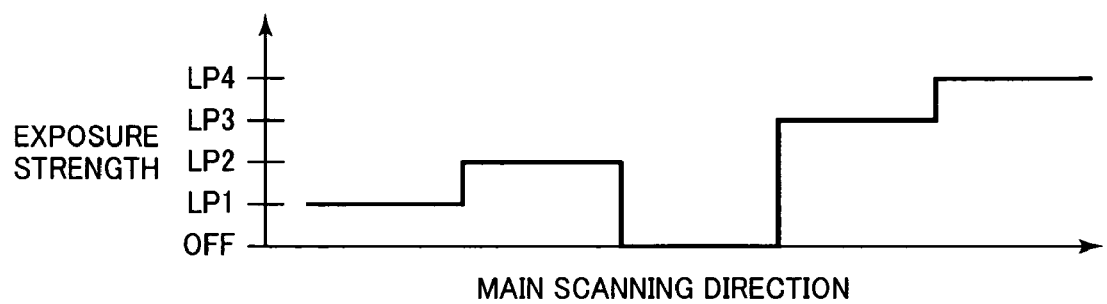
FIG. 5 is a diagrammatic view showing an example of a change timing of an exposure intensity according to the present embodiment.

FIG. 5 is a diagrammatic view showing an example of a change timing of an exposure intensity according to the present embodiment. The abscissa axis indicates a main scanning direction of the photosensitive drum, and the ordinate axis indicates an exposure intensity LP. Further, the abscissa axis also corresponds to an elapsed time. In this example, five surface areas different from each other are measured by using five electric potential sensors, so that the different exposure intensities (for example, OFF (zero), LP1 to LP4 or the like) are applied to respective surface areas. Specifically, the exposure intensity is changed in the order of LP1, LP2, OFF, LP3, and LP4.

Figure 6:
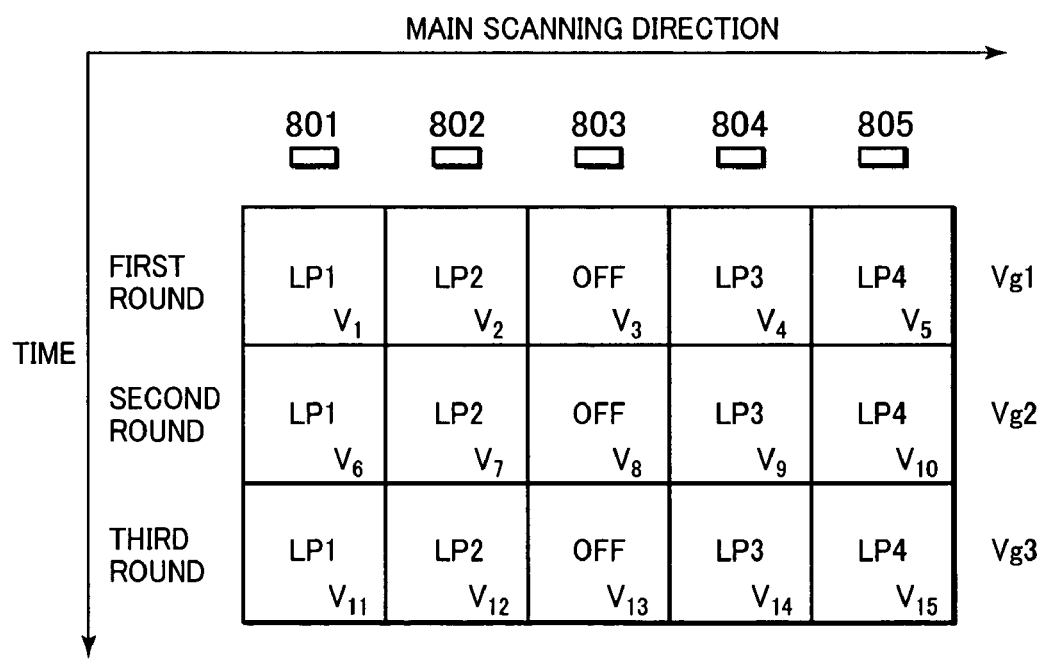
FIG. 6 is a diagrammatic view showing a relation between the exposure intensity and a surface area according to the present embodiment.

FIG. 6 is a diagrammatic view showing a relation between the exposure intensity and the surface area according to the present embodiment. According to the change timing of the exposure intensity shown in FIG. 5, the first surface area opposed to the electric potential sensor 81 is charged by the applied bias Vg1 and is exposed by the exposure intensity LP1. The second surface area opposed to the electric potential sensor 82 is charged by the applied bias Vg1 and is exposed by the exposure intensity LP2. In addition, the third surface area opposed to the electric potential sensor 83 is charged by the applied bias Vg1 but it is not exposed because the exposure intensity is set at zero (OFF). The fourth surface area opposed to the electric potential sensor 84 is charged by the applied bias Vg1 and is exposed by the exposure intensity LP3, and the fifth surface area opposed to the electric potential sensor 85 is charged by the applied bias Vg1 and is exposed by the exposure intensity LP4. The CPU 30 keeps this state over one round of the photosensitive drum 1, and the respective electric potential sensors 81 to 85 measure the surface electric potentials of the corresponding surface areas in the meantime. Further, the CPU 30 may measure the surface electric potential in the predetermined number during one round of the photosensitive drum 1, and the average value of the obtained plurality of measured values may be made into the final measurement result in order to prevent affection of the unevenness of charge with respect to a circumferential direction of the photosensitive drum.

Figure 7:
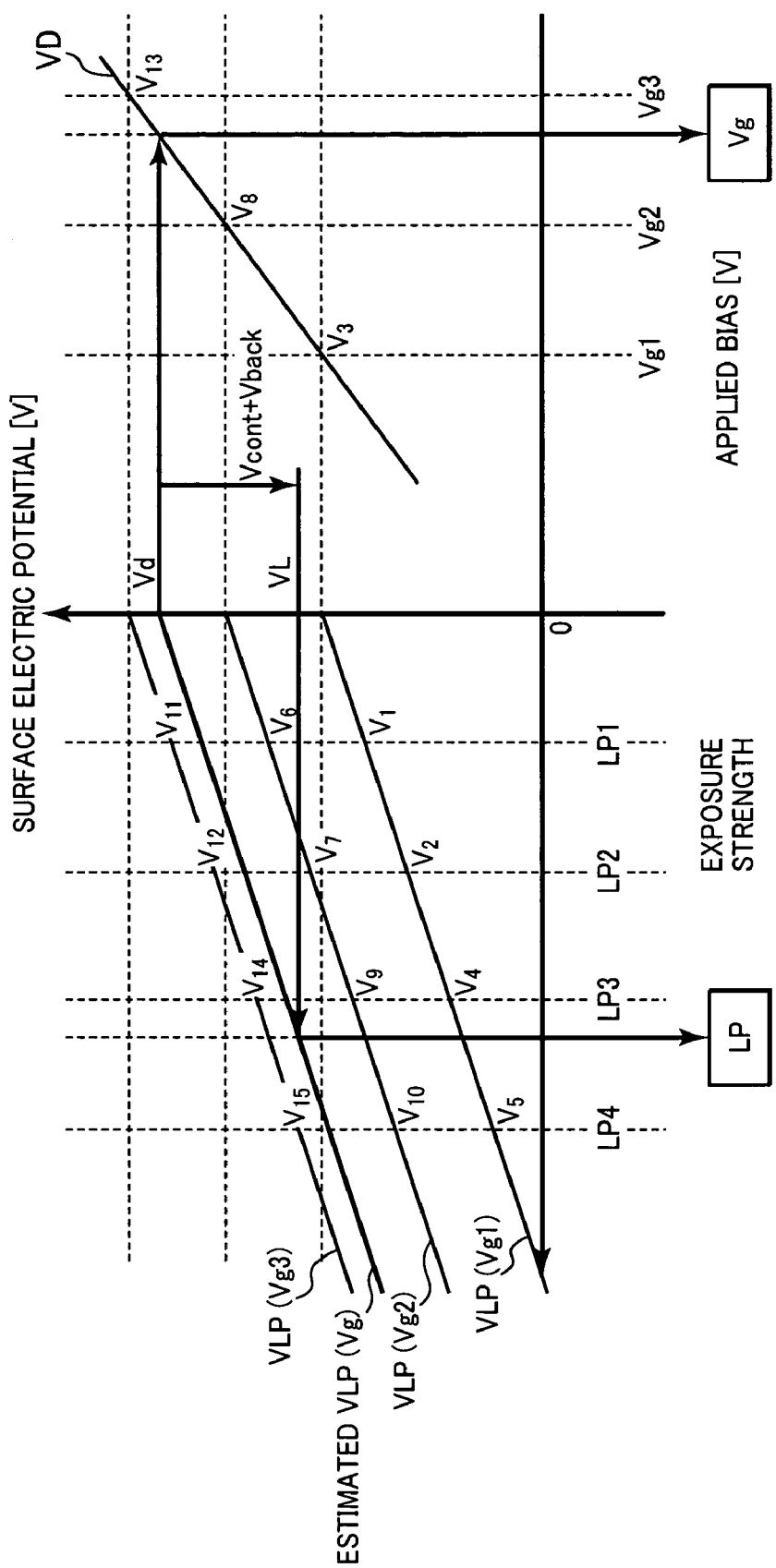
FIG. 7 is a diagrammatic view showing a relation between a VLP property and a VD property according to the present embodiment.

FIG. 7 is a diagrammatic view showing a relation between the VLP characteristic and the VD characteristic according to the present embodiment. In this example, in step S401, the VLP (Vg1) characteristic can be obtained from a relation between the used exposure intensity and the measured surface electric potential.

In step S402, the CPU 30 sets the applied bias to the charge apparatus 2 at Vg2, to charge the photosensitive drum 1. Further, upon scanning of the optical beam 12 in the main scanning direction of the photosensitive drum 1, the CPU 30 scans the drum while changing the exposure intensity at a predetermined time interval (FIG. 5). In addition, the CPU 30 concurrently measures the surface electric potentials V6 to V10 of the respectively corresponding surface areas (on the photosensitive drum 1) by the electric potential sensors 81 to 85 that are arranged equally spaced (FIG. 6). Thereby, VLP (Vg2) can be obtained (FIG. 7).

In step S403, the CPU 30 sets the applied bias to the charge apparatus 2 at Vg3, to charge the photosensitive drum 1. Further, upon scanning of the optical beam 12 in the main scanning direction of the photosensitive drum 1, the CPU 30 scans the drum while changing the exposure intensity at a predetermined time interval (FIG. 5). In addition, the CPU 30 concurrently measures the surface electric potentials V11 to V15 of the respectively corresponding surface areas (on the photosensitive drum 1) by the electric potential sensors 81 to 85 that are arranged equally spaced (FIG. 6). Thereby, VLP (Vg3) can be obtained (FIG. 7).

In step S404, reading the surface electric potentials V3, V8, and V13 when the exposure intensity is zero from the storage device 31, the CPU 30 obtains the VD characteristic representing a relation between the applied bias Vg to the charge apparatus 2 and the surface electric potential V (FIG. 7). For example, by linearly approximating the surface electric potentials V3, V8, and V13, it is possible to determine a formula representing the VD characteristic. Further, the CPU 30 determines the applied bias Vg in order to obtain the target electric potential at the dark section (Vd). For example, by assigning Vd to a formula of a line representing the VD characteristic, Vg can be calculated.

In step S405, the CPU 30 estimates the VLP (Vg) characteristic with respect to the applied bias Vg to determine the exposure intensity (LP) for obtaining the electric potential of the bright section (VL) from the estimated VLP (Vg) property.

The VLP (Vg) characteristic can be estimated as follows, for example. The CPU 30 calculates the VLP (Vg) characteristic by using the characteristic of which zero intercept is larger than Vd (for example, the VLP (Vg3) property) and that of which zero intercept is smaller than Vd (for example, the VLP (Vg2) characteristic) among the VLP (Vg1) characteristic to the VLP (Vg3) characteristic obtained in steps S401 to S403.

More specifically, a collinear approximation formula representing the VLP (Vg3) characteristic is as follows:

$$Vs\text{-}Vg2 = m1 \times LP \text{ (the exposure intensity)} + n1$$

In addition, a collinear approximation formula representing the VLP (Vg2) characteristic is as follows:

$$Vs-Vg3=m2 \times LP \text{ (the exposure intensity)} + n2$$

Therefore, the inclination and the intercept of the collinear approximation formula representing the VLP (Vg) characteristic are as follows:

Inclination: $((n1-Vd)/(n1-n2)) \times m2 + ((Vd-n2)/(n1-n2)) \times m1$

Intercept: $Vd$

Thereby, the exposure intensity when the surface electric potential becomes VL is as follows:

$$LP = (VL-Vd)/((n1-Vd)/(n1-n2)) \times m2 + ((Vd-n2)/(n1-n2)) \times m1)$$

As such, VL=Vd−(Vcont+Vback) is established.

The CPU 30 stores in the storage device 31 the applied bias Vg to the charge apparatus 2 for obtaining the electric potential at the dark section (Vd) and the exposure intensity LP for obtaining the electric potential at the bright section (VL). Further, upon formation of the image, setting the applied bias to the charge apparatus 2 at Vg, setting the applied bias to the development apparatus at (Vg−Vback), and setting the largest value of the exposure intensity at LP, the CPU 30 forms the image.

After that, the CPU 30 turns a remote signal to control the electric potential sensors 81 to 85 OFF to terminate the measurement of the electric potential.

As described above, according to the present embodiment, upon exposing the first to fifth surface areas on the photosensitive drum 1 while scanning the optical beam 12, the exposure is carried out while changing the exposure intensity of the optical beam for each surface area to detect the surface electric potential of the surface area, so that it is possible to shorten the adjustment time of the applied bias Vg to the charge apparatus 2 for obtaining the predetermined electric potential at the dark section Vd and the exposure intensity LP of the optical beam 12 necessary for obtaining the predetermined electric potential at the bright section VL than the conventional adjustment time thereof.

For example, it is necessary to rotate the photosensitive drum 1 in seven rounds conventionally. However, according to the present embodiment, the photosensitive drum 1 may be rotated only in three rounds. Thereby, it is possible to shorten the adjustment time.

In addition, according to the present embodiment, obtaining a correspondence relation between the applied biases Vg1, Vg2, and Vg3 and the surface electric potentials V3, V8, and V13 (for example, the VD characteristic) on the basis of the plurality of surface electric potentials V3, V8, and V13 detected when the exposure intensity of the optical beam 12 is a first value (for example, zero), the CPU 30 can determine the applied bias Vg necessary for obtaining the predetermined electric potential at the dark section Vd on the basis of the obtained correspondence relation. Further, obtaining a correspondence relation between the exposure intensity and the surface electric potential (for example, VLP (Vg2) and VLP (Vg3) on the basis of a plurality of surface electric potentials (for example, V6 and V1 or the like) detected when the exposure intensity of the optical beam 12 is a second value (for example, LP1) and a plurality of surface electric potentials (for example, V7 and V12 or the like) detected when the exposure intensity of the optical beam 12 is a third value (for example, LP2), the CPU 30 can determine the exposure intensity LP of the optical beam 12 necessary for obtaining the predetermined electric potential of the bright section VL.

As described above, a first correspondence relation relevant to the exposure intensity and the surface electric potential is represented by a collinear approximation formula having a zero intercept larger than that of the electric potential at the dark section Vd (for example, VLP(Vg3)), and a second correspondence relation relevant to the exposure intensity and the surface electric potential is represented by a collinear approximation formula having a zero intercept smaller than that of the electric potential at the dark section Vd (for example, VLP(Vg2)). In a formula for obtaining the exposure intensity LP of the optical beams 12 necessary for obtaining the predetermined electric potential at the bright section VL (VLP(Vg)), the intercept is Vd. As a result, by using two collinear approximation formulas having the intercept close to this Vd, the formula of the VLP(Vg) characteristic may be estimated. Thus, upon determination of the exposure intensity, by obtaining a third collinear approximation formula having the electric potential at the dark section as the zero intercept (for example, VLP (Vg)) on the basis of the first electric potential at the dark section (for example, VLP (Vg3)) and the second electric potential at the dark section (for example, VLP (Vg2)), the exposure intensity necessary for obtaining the predetermined electric potential at the bright section can be determined.

In addition, according to the present embodiment, by employing the plurality of electric potential sensors 81 to 85 arranged in a line with respect to a scanning direction of the optical beam as the surface electric potential detecting apparatus 8, a space in a sub scanning direction of the photosensitive drum 1 can be utilized more effectively as compared to the conventional art.

Further, according to the present embodiment, by arranging the plurality of electric potential sensors 81 to 85 arranged at predetermined intervals (for example, equal intervals), as a switching timing of the exposure intensity, a predetermined interval time depending on a predetermined distance and a scanning velocity can be also used. Therefore, it is possible to easily control the switching timing.

Further, the CPU 30 can reduce the affect from the unevenness in charging by obtaining the average value from the surface electric potentials measured at a plurality of measurement positions within respective surface areas and determining it as a surface electric potential of the surface area.

According to the above-described embodiment, making the timing corresponding to one revolution of the photosensitive drum 1 into the switching timing of the applied bias and switching the exposure intensity in four times during this timing (one round) (namely, five kinds of exposure intensity are used in total), the surface electric potential can be effectively measured over the entire photosensitive drum 1.

In order to change the exposure intensity, the CPU 30 may change the emission density of a laser diode 13. For example, the emission density thereof may be changed into LP1=2.0 mW, LP2=3.0 mW, and LP3=4.0 mW or the like. In addition, in order to change the exposure intensity, a driving duty (an emission pulse level of the laser diode 13 may be changed). For example, the driving duty thereof may be changed into LP1=PWM1=50%, LP2=PWM2=65%, and LP3=PWM3=80% or the like.

Second Embodiment

According to the second embodiment, the confirmation processing of the applied bias Vg and the exposure intensity LP that are determined in the above-described embodiment will be described below. This confirmation processing can be carried out, for example, next to step S405.

Figures 8, 9:
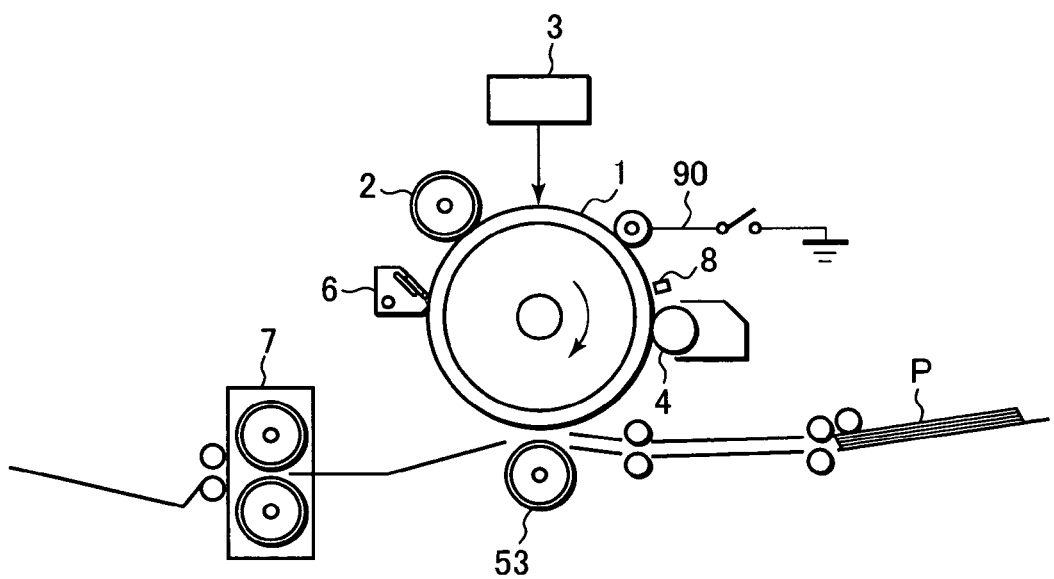
FIG. 8 is a diagrammatic view showing a relation between the exposure intensity and a surface area according to the present embodiment.
FIG. 9 is a diagrammatic view illustrating principle parts of the other image forming apparatus according to the present embodiment.

FIG. 8 is a diagrammatic view showing a relation between the exposure intensity and the surface area according to the present embodiment. In this example, at the fourth rotation of the photosensitive drum 1, the CPU 30 reads the determined applied bias Vg from the storage device 31 and sets the read Vg at the high voltage power source 32. The photosensitive drum 1 is charged by the applied bias Vg from the charge apparatus 2. In addition, the CPU 30 alternatively sets LP and OFF in one main scanning line. In the example shown in FIG. 8, with respect to the surface area of the photosensitive drum 1 opposed to the plurality of electric potential sensors 81, 83, and 85, the exposure intensity is OFF, and with respect to the area opposed to the remaining electric potential sensors 82 and 84, the exposure intensity is LP. Thus, measuring the surface electric potential of each surface area, calculating the real electric potentials at the dark section Vd and at the bright section VL, and comparing the calculated values with each of a desired electric potential at the dark section Vd and a desired electric potential at the bright section VL, the CPU 30 can confirm if the applied bias Vg and the exposure intensity can be correctly adjusted or not. In addition, when it is determined that an error is large as the result of comparison, the CPU 30 can improve the reliability of the adjustment processing by carrying out the adjustment processing again.

Third Embodiment

In the case of using the plurality of electric potential sensors, depending on an environment where they are used and degree of contamination thereof, offset values owned by the electric potential sensors 81 to 85, respectively, may be varied individually. If the offset values are varied, it becomes difficult to measure the surface electric potential with a high degree of accuracy. Therefore, according to the present embodiment, the processing to correct inconsistency of the offset among the electric potential sensors 81 to 85 will be described. For example, this correction processing may be carried out when the electric potential sensors 81 to 85 are turned ON in step S401.

FIG. 9 is a diagrammatic view illustrating one example of another image forming apparatus according to the present embodiment. With respect to the parts that have been described, the same reference numerals are given and the explanation thereof is herein omitted. A neutralization apparatus 90 removes electricity as being controlled by the CPU 30.

Figure 10:
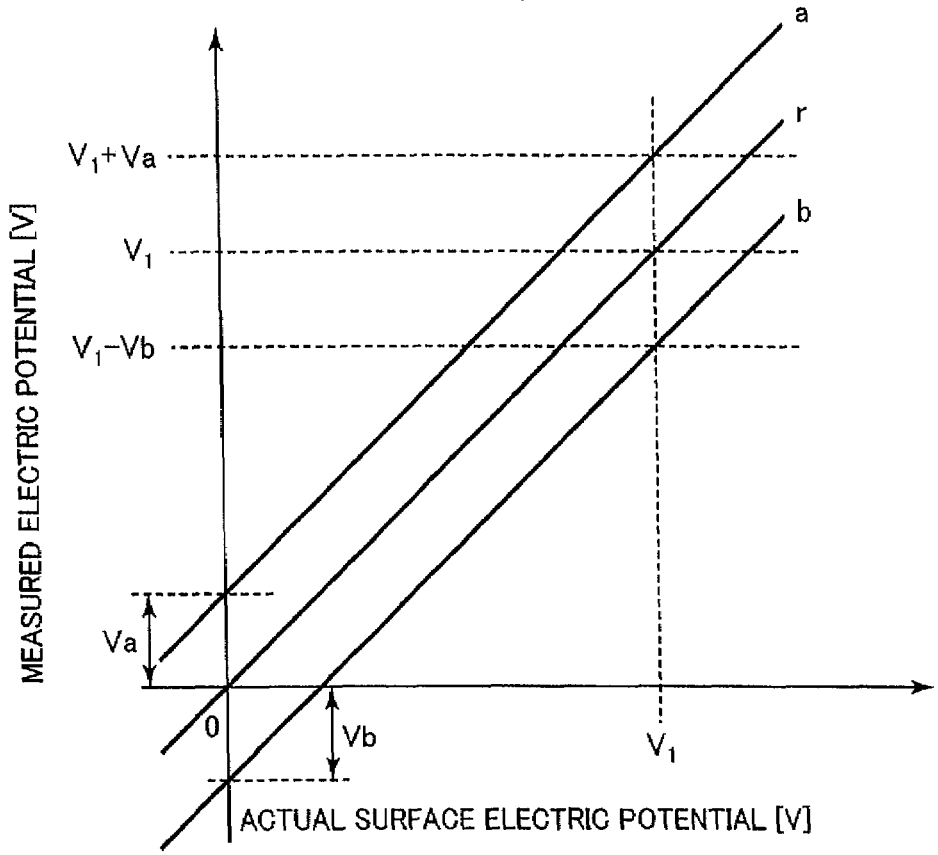
FIG. 10 is a diagrammatic view illustrating the offset correction processing according to the present embodiment.

FIG. 10 is a diagrammatic view illustrating the offset correction processing according to the present embodiment. Above all, this figure shows a relation between the actual surface electric potential and the measured electric potential measured by the electric potential sensor. A line "r" shows a so-called ideal characteristic that the actual surface electric potential coincides with the measured electric potential. In other words, when the surface electric potential of the photo conductor is 0[V], the measured electric potential is also 0[V], and when the surface electric potential of the photo conductor is V1, the measured electric potential is also V1.

On the other hand, a line "a" shows the measured electric potential that is measured by the electric potential sensor having a plus offset value (Va). In other words, when the actual surface electric potential is 0[V], the measured electric potential is Va, so that when the surface electric potential is V1, the measured electric potential is also V1+Va.

A line "b" shows the measured electric potential that is measured by the electric potential sensor having a minus offset value (−Vb). In other words, when the actual surface electric potential is 0[V], the measured electric potential is −Vb, so that when the surface electric potential is V1, the measured electric potential is also V1−Vb.

When the electric potential sensors 81 to 85 are turned ON, for example, in step S401 or the like, the CPU 30 measures the surface electric potential of the photosensitive drum 1 via the electric potential sensors 81 to 85 while removing electricity of the surface electric potential of the photosensitive drum 1 via the neutralization apparatus 90. Further, the CPU 30 stores the measurement result of each electric potential sensor as the offset value in the storage device 31. For example, in the case that the measured electric potential of the electric potential sensor 81 is Va in FIG. 10, the offset value of the electric potential sensor 81 can be the offset value in the storage device 31, and upon measuring at step S402 or after, the measurement result is corrected so as to negate this offset value.

As described above, according to the present embodiment, providing the neutralization apparatus 90 to remove electricity of the photosensitive drum 1, the surface electric potential of the photosensitive drum 1 having electricity removed is detected by the CPU 30, and the offset value is obtained so as to correct the detection result of a surface electric potential detector 8 by this offset value. Therefore, by correcting the offset value of each electric potential sensor, measurement of the electric potential with a higher degree of accuracy can be realized. The adjustment accuracy of the applied bias Vg to the charge apparatus 2 necessary for obtaining a predetermined electric potential of a dark section Vd and the exposure intensity LP of the optical beam 12 necessary for obtaining a predetermined electric potential of the bright section VL are also improved.

Fourth Embodiment

According to the above-described embodiment, the plurality of electric potential sensors 81 to 85 are used as the surface electric potential detector 8. Therefore, in the present embodiment, the description of the surface electric potential detector 8 that can decrease the number of the electric potential sensor will be given below.

Figure 11:
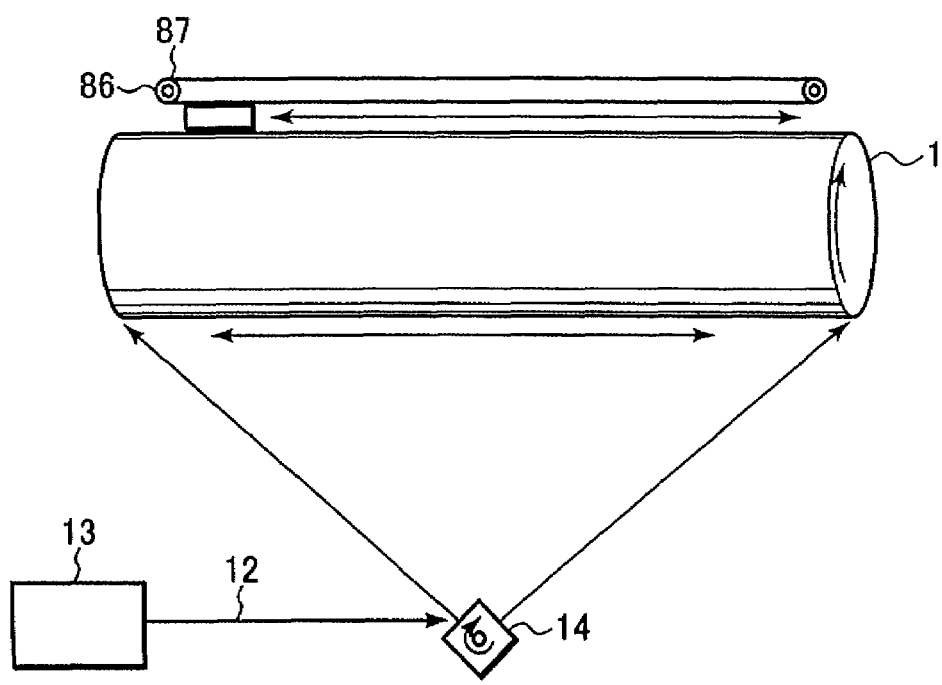
FIG. 11 is a diagrammatic view illustrating a principle structure of the other image forming apparatus according to the present embodiment.

FIG. 11 is a diagrammatic view illustrating a part of another image forming apparatus according to the present embodiment. With respect to the parts that have been described, the same reference numerals are given and the explanation thereof is herein omitted. In the example shown in FIG. 11, at least one electric potential sensor 86 is disposed, and this electric potential sensor 86 is reciprocated along a main scanning direction of the photosensitive drum 1 by a moving apparatus 87. The CPU 30 moves the electric potential sensor 86 at a timing and a movement velocity by controlling the moving apparatus 87. Two or more electric potential sensors 86 may be provided, however, the less number of sensors used, the higher the cost reduction effect.

Figure 12:
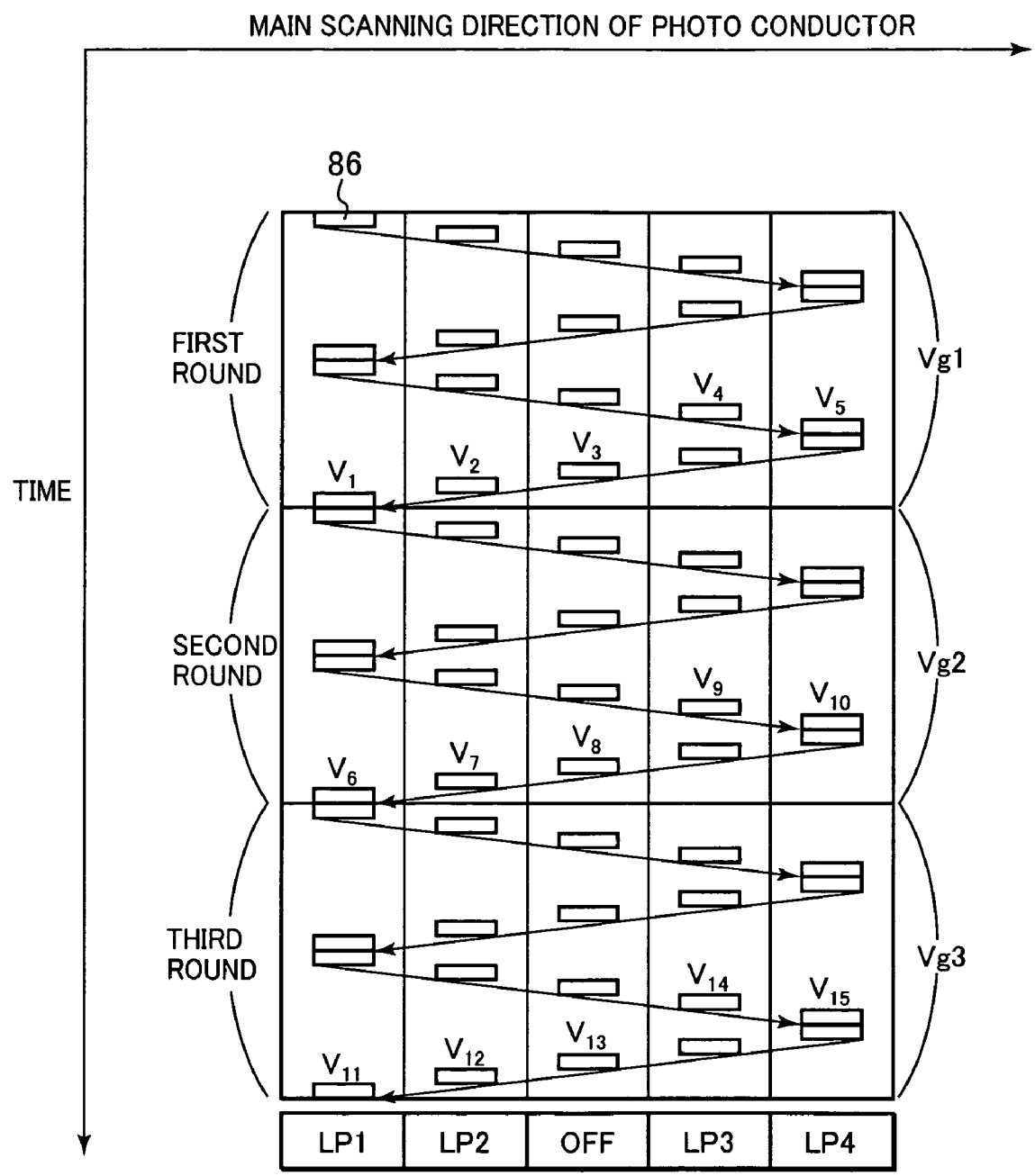
FIG. 12 is a diagrammatic view illustrating an example of movement of an electric potential sensor according to the present embodiment.

FIG. 12 is a diagrammatic view illustrating an example of movement of an electric potential sensor according to the present embodiment. The charged state and the exposed state of the photosensitive drum 1 are as described above with reference to FIG. 6 or the like.

In the above-described step S401, the electric potential sensor 86 starts the reciprocating motion along the main scanning direction of the photosensitive drum 1 according to an arrow shown in FIG. 12. Above all, FIG. 12 shows an example that the electric potential sensor 86 reciprocates twice during one round of the photosensitive drum 1. The electric potential sensor 86 measures the surface electric potential when it passes through each surface area of the photosensitive drum 1.

According to the example shown in FIG. 12, at first, in an outward route, the surface electric potential of the first surface area that has been exposed with LP1 is measured. Hereafter, the second surface area that has been exposed with LP2, the third surface area that is not been exposed (namely, the exposure intensity is zero), the fourth surface area that has been exposed with LP3, and the fifth surface are that has been exposed with LP4 are measured sequentially. If the movement direction of the electric potential sensor 86 is changed into a homeward route, the electric potentials are measured in the reverse order from the fifth to the first area. After that, the route is changed to the outward route again.

According to this example, during one round of the photosensitive drum 1, it is possible to measure the surface electric potentials of five surface areas four times, respectively. If the average value is calculated from these four measurement results, it is possible to reduce the affect due to unevenness of charge.

Figure 13:
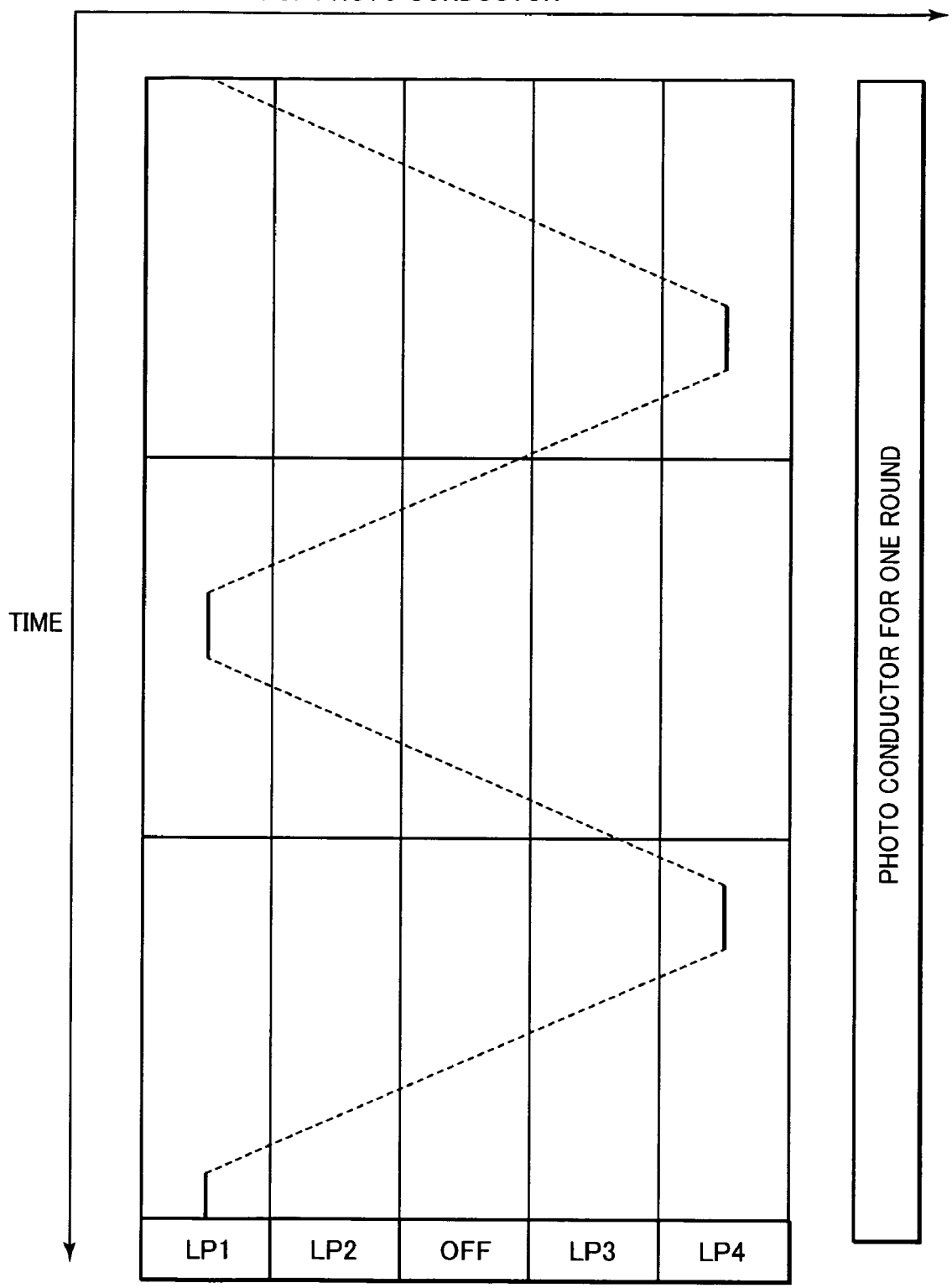
FIG. 13 is a diagrammatic view illustrating an example of reciprocatory motion of the electric potential sensor according to the present embodiment.

FIG. 13 is a diagrammatic view illustrating an example of reciprocatory motion of the electric potential sensor according to the present embodiment. This example relates to a movement locus of the electric potential sensor 86 during one round of the photosensitive drum 1. A doted line in the drawing shows the state that the electric potential sensor 86 is moving. On the other hand, a full line shows the state that movement of the electric potential sensor 86 is interrupted (namely, the state that the electric potential sensor 86 stops).

A pattern of the reciprocatory motion of the electric potential sensor 86 is determined from parameters such as a property of the used electric potential sensor 86 and a rotation velocity of the photosensitive drum 1 or the like based on an empirical rule. For example, when the response time of the electric potential sensor 86 is sufficiently short, as shown in FIG. 13, even in the middle of movement (shown by the doted line), the electric potential sensor 86 can sufficiently measure the electric potential. However, if the response time of the electric potential sensor 86 is long, there is a possibility that the electric potential sensor 86 cannot measure the electric potential with a high degree of accuracy while moving.

Figure 14:
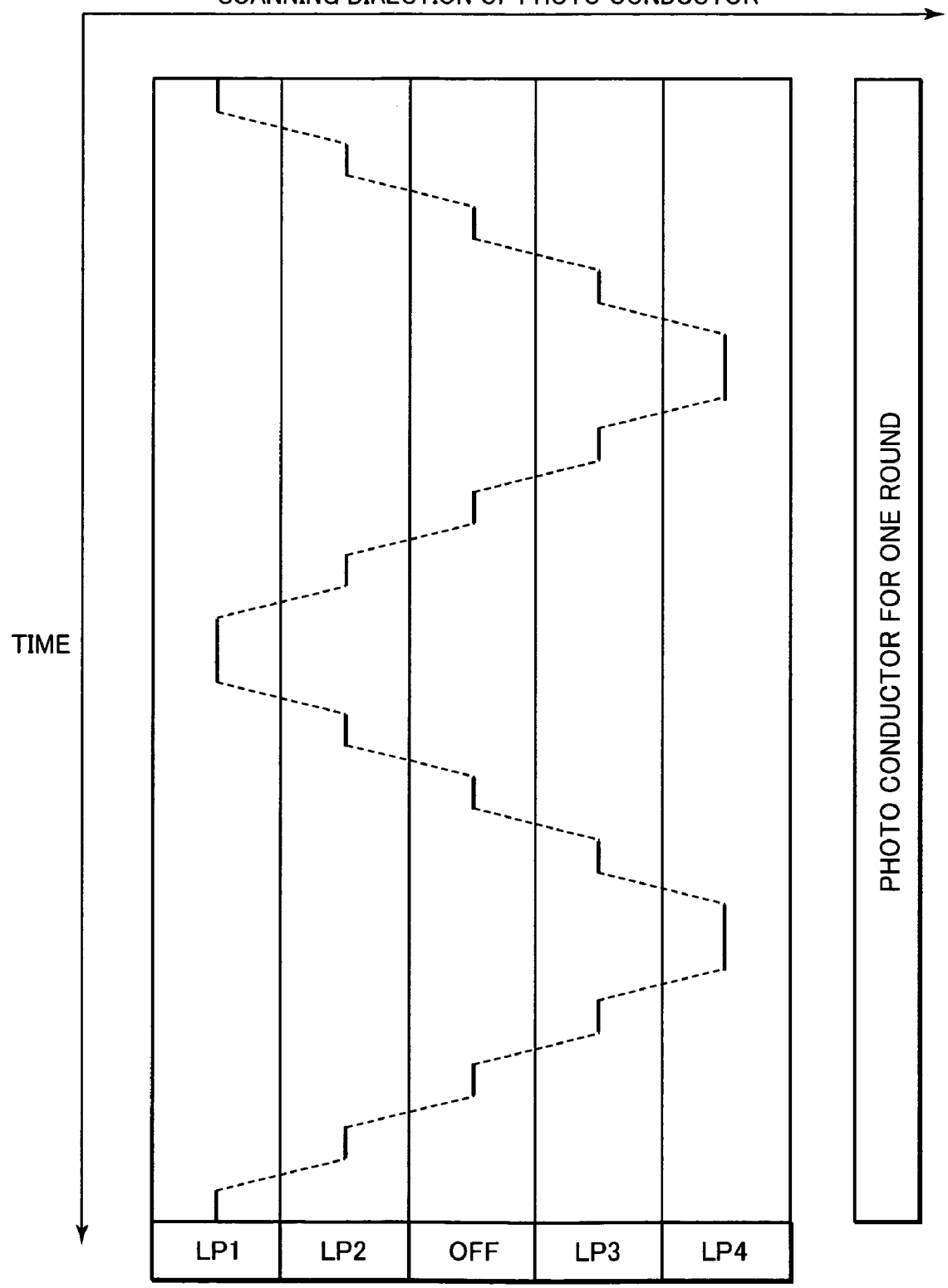
FIG. 14 is a diagrammatic view illustrating the other example of reciprocatory motion of the electric potential sensor according to the present embodiment.

FIG. 14 is a diagrammatic view illustrating another example of reciprocatory motion of the electric potential sensor according to the present embodiment. In the case that the response time of the electric potential sensor 86 is long, as shown in FIG. 14, if the electric potential sensor 86 reaches a predetermined measurement position, the electric potential sensor 86 stops movement once, and waiting for the response time of the electric potential sensor 86, the electric potential sensor 86 measures the surface electric potential. If the measurement is completed, moving to a next measurement position, the electric potential sensor 86 measures the surface electric potential in the same procedure. Thereby, it is possible to use the electric potential sensor with insufficient response velocity.

Figure 15:
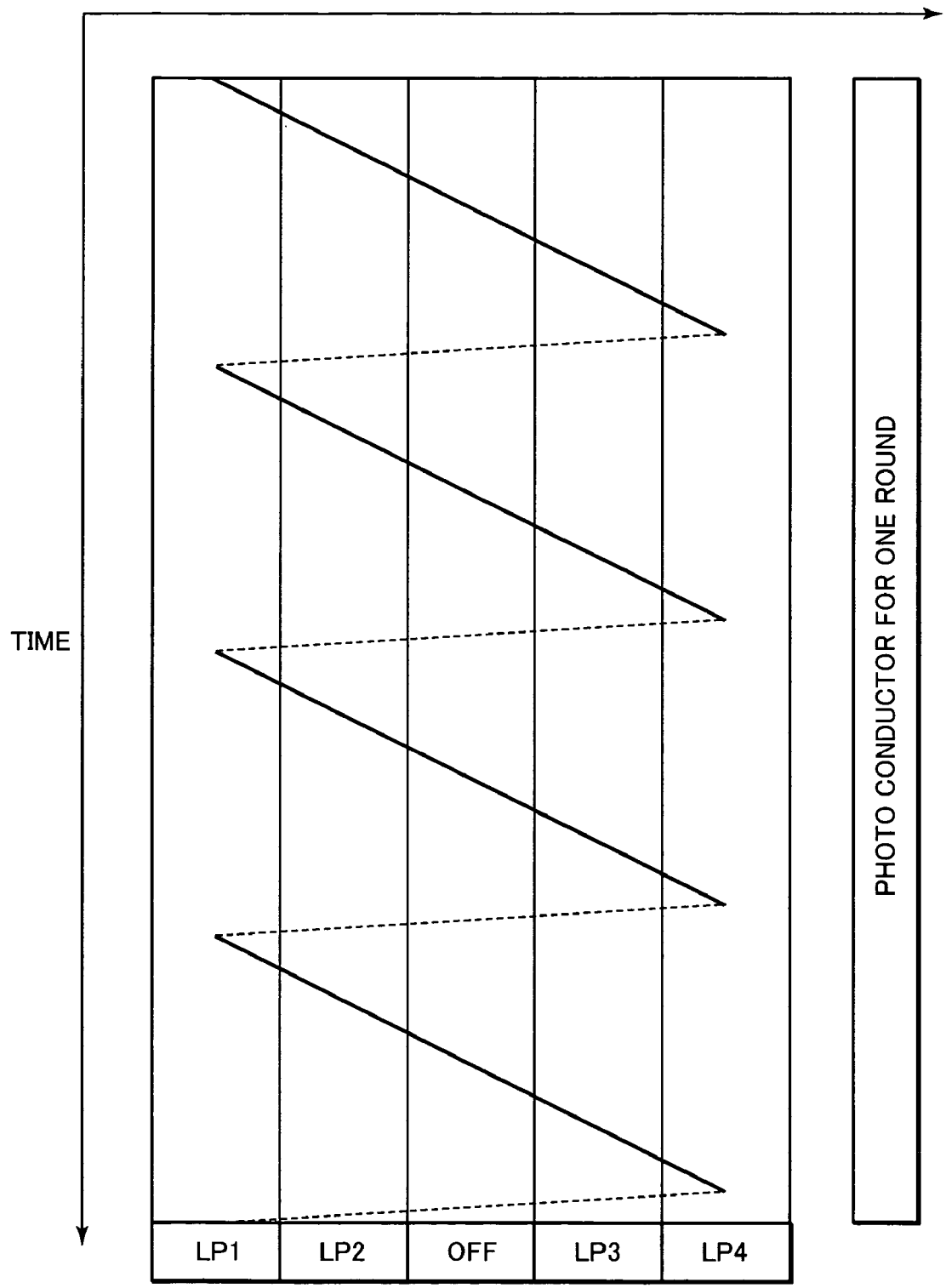
FIG. 15 is a diagrammatic view illustrating still other example of reciprocatory motion of the electric potential sensor according to the present embodiment.

FIG. 15 is a diagrammatic view illustrating still another example of reciprocatory motion of the electric potential sensor according to the present embodiment. Above all, this drawing shows a pattern of motion when the user intends to measure the surface electric potential only in the outward route for any reasons. For example, the surface electric potential of the photosensitive drum 1 is measured while moving the electric potential sensor 86 only in the outward route. On the other hand, in the homeward route, returning the electric potential sensor 86 to a home position in the homeward route at a higher velocity than that of the outward route, the measurement in the outward route may be repeated.

As described above, according to the present embodiment, providing at least one electric potential sensor 86 that can move in the scanning direction of the optical beam 12 (namely, the main scanning direction of the photosensitive drum 1), the same advantage as the above-described embodiment can be obtained by detecting the surface electric potentials of the plurality of surface areas by this electric potential sensor 86. In other words, even if the number of electric potential sensors is decreased than the number of the surface areas to be measured, the same advantage as that of the first embodiment or the like can be obtained. For example, the plurality of surface areas means respective areas that are divided into a predetermined number in the main scanning direction of the photo conductor (FIG. 6, FIG. 8, and FIG. 12 or the like).

In addition, when the electric potential sensor 86 reaches the measurement position on the surface area, by movably controlling the electric potential sensor 86 so as to stop the motion of the electric potential sensor 86 once, the CPU 30 can employ the electric potential sensor with the low response speed.

Further, the CPU 30 can obtain a plurality of measurement results with respect to the area by movably controlling the electric potential sensor 86 so as to reciprocate the surface area as the measurement target in plural times. Further, taking the average value from the plural measurement results, it is possible to decrease the affect due to unevenness of charge in a sub scanning direction.

Other Embodiments

Various embodiments have been described above. Nevertheless, the respective embodiments can be appropriately combined unless they are inconsistent with each other.

In addition, the above-described image forming apparatus can be used in various apparatuses such as a printer, a copy machine, and a complex machine or the like.

In addition, according to the above-described embodiment, in order to make the present invention easy to understand, the image forming apparatus in a black and white system is described. Nevertheless, the embodiments can be applied to an image forming apparatus in a color system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-136501, filed May 9, 2005, which is hereby incorporated by reference herein in its entirety.

What is claimed is:
1. An image forming apparatus comprising:
a rotatable image bearing member;
a charging device configured to charge the image bearing member with a different applied bias for each predetermined timing;

an exposure device exposing surface areas of the charged image bearing member by scanning with an optical beam, while changing an exposure intensity of the optical beam;

an electric potential detecting device detecting respective surface electric potentials of the surface areas in which the exposure intensity is changed;

a control device controlling the applied bias to the charging device necessary for obtaining a predetermined electric potential of a dark section and the exposure intensity of the optical beam necessary for obtaining a predetermined electric potential of a bright section, on the basis of the surface electric potentials that are detected respectively from the different applied biases and the different exposure intensities;

an applied bias determining part obtaining a first correspondence relation between the different applied biases and the surface electric potentials on the basis of the surface electric potentials that are detected when the exposure intensity takes a first value, and determining the applied bias necessary for obtaining the predetermined electric potential of the dark section on the basis of the obtained first correspondence relation; and an exposure intensity determining part obtaining a second correspondence relation between the different exposure intensities and the surface electric potentials on the basis of the surface electric potentials that are detected when the exposure intensity takes a second value and the surface electric potentials that are detected when the exposure intensity takes a third value, and determining the exposure intensity necessary for obtaining the predetermined electric potential of the bright section on the basis of the obtained second correspondent relation.

2. The image forming apparatus according to claim 1, wherein the exposure intensity is zero when the exposure intensity takes the first value.

3. An image forming apparatus comprising:

a rotatable image bearing member;

a charging device configured to charge the image bearing member with a different applied bias for each predetermined timing;

an exposure device exposing surface areas of the charged image bearing member by scanning with an optical beam, while changing an exposure intensity of the optical beam;

an electric potential detecting device detecting respective surface electric potentials of the surface areas in which the exposure intensity is changed;

a control device controlling the applied bias to the charging device necessary for obtaining a predetermined electric potential of a dark section and the exposure intensity of the optical beam necessary for obtaining a predetermined electric potential of a bright section, on the basis of the surface electric potentials that are detected respectively from the different applied biases and the different exposure intensities;

an applied bias determining part obtaining a first correspondence relation between the different applied biases and the surface electric potentials on the basis of the surface electric potentials that are detected when the exposure intensity takes a first value, and determining the applied bias necessary for obtaining the predetermined electric potential of the dark section on the basis of the obtained first correspondence relation; and an exposure intensity determining part which obtains a plurality of second correspondence relations between the different exposure intensities and the surface electric potentials on the basis of the surface electric potentials that are detected when the exposure intensity takes a second value and the surface electric potentials that are detected when the exposure intensity takes a third value different from the second value, and determining the exposure intensity necessary for obtaining the predetermined electric potential of the bright section by obtaining a third correspondence relation that the electric potential of the dark section is a zero intercept on the basis of the obtained plurality of second correspondent relations.

4. The image forming apparatus according to claim 3, wherein the plurality of second correspondence relations relevant to the exposure intensities and the surface electric potentials are represented by a first collinear approximation formula having a zero intercept larger than that of the electric potential at the dark section and by a second collinear approximation formula having a zero intercept smaller than that of the electric potential at the dark section.

5. The image forming apparatus according to claim 4, wherein the exposure intensity determining part determines the exposure intensity necessary for obtaining the predetermined electric potential of the bright section by obtaining a third collinear approximation formula that the electric potential of the dark section is a zero intercept on the basis of the first collinear approximation formula and the second collinear approximation formula.

6. The image forming apparatus according to claim 3, wherein the exposure intensity is zero when the exposure intensity takes the first value.

7. An image forming apparatus comprising:

a rotatable image bearing member;

a charging device configured to charge the image bearing member with a different applied bias for each predetermined timing;

an exposure device exposing surface areas of the charged image bearing member by scanning with an optical beam, while changing an exposure intensity of the optical beam;

an electric potential detecting device detecting respective surface electric potentials of the surface areas in which the exposure intensity is changed; and a control device controlling the applied bias to the charging device necessary for obtaining a predetermined electric potential of a dark section and the exposure intensity of the optical beam necessary for obtaining a predetermined electric potential of a bright section, on the basis of the surface electric potentials that are detected respectively from the different applied biases and the different exposure intensities, wherein the exposure intensity is changed for every area that is divided into the predetermined number in a main scanning direction of the image bearing member.

8. The image forming apparatus according to claim 7, wherein the electric potential detecting device includes a plurality of sensors that are arranged in a scanning direction of the optical beam.

9. The image forming apparatus according to claim 8, wherein the plurality of sensors are arranged at predetermined intervals.

10. The image forming apparatus according to claim 7, wherein the electric potential detecting device includes at least one sensor that detects a surface electric potential for each surface area of which the exposure intensity is changed while moving toward the scanning direction of the optical beam.

11. The image forming apparatus according to claim 7, wherein the predetermined timing is substantially equivalent to one round of the image bearing member.

12. An image forming apparatus comprising:
a rotatable image bearing member;
a charging device configured to charge the image bearing member with a different applied bias for each predetermined timing;
an exposure device exposing surface areas of the charged image bearing member by scanning with an optical beam, while changing an exposure intensity of the optical beam;
an electric potential detecting device detecting respective surface electric potentials of the surface areas in which the exposure intensity is changed; and
a control device controlling the applied bias to the charging device necessary for obtaining a predetermined electric potential of a dark section and the exposure intensity of the optical beam necessary for obtaining a predetermined electric potential of a bright section, on the basis of the surface electric potentials that are detected respectively from the different applied biases and the different exposure intensities,
wherein the predetermined timing is substantially equivalent to one round of the image bearing member.

13. An image forming apparatus comprising:
a rotatable image bearing member;
a charging device configured to charge the image bearing member with a different applied bias for each predetermined timing;
an exposure device exposing surface areas of the charged image bearing member by scanning with an optical beam, while changing an exposure intensity of the optical beam;
an electric potential detecting device detecting respective surface electric potentials of the surface areas in which the exposure intensity is changed;
a control device controlling the applied bias to the charging device necessary for obtaining a predetermined electric potential of a dark section and the exposure intensity of the optical beam necessary for obtaining a predetermined electric potential of a bright section, on the basis of the surface electric potentials that are detected respectively from the different applied biases and the different exposure intensities; and
an electricity removing part configured to remove electricity from the image bearing member; and a correcting part correcting the detection result of the electric potential detecting device depending on the surface electric potential of the electrostatic image bearing member having electricity removed.

14. A control method of an image forming apparatus including a rotatable image bearing member, comprising the following steps:
charging the image bearing member with a different applied bias for each predetermined timing, and exposing surface areas of the charged image bearing member by scanning the image bearing member with an optical beam, while changing an exposure intensity of the optical beam for every area that is divided into the predetermined number in a main scanning direction of the image bearing member;
detecting respective surface electric potentials of the surface areas; and
controlling the applied bias necessary for obtaining a predetermined electric potential of a dark section and the exposure intensity of the optical beam necessary for obtaining a predetermined electric potential of a bright section, on the basis of the surface electric potentials detected in the detecting step respectively from the different applied biases and the different exposure intensities.

15. A control method of an image forming apparatus including a rotatable image bearing member, comprising the following steps:
charging the image bearing member with a different applied bias for each predetermined timing, and exposing surface areas of the charged image bearing member by scanning the image bearing member with an optical beam, while changing an exposure intensity of the optical beam;
detecting respective surface electric potentials of the surface areas; and
controlling the applied bias necessary for obtaining a predetermined electric potential of a dark section and the exposure intensity of the optical beam necessary for obtaining a predetermined electric potential of a bright section, on the basis of the surface electric potentials detected in the detecting step respectively from the different applied biases and the different exposure intensities,
wherein the predetermined timing is substantially equivalent to one round of the image bearing member.

* * * * *